UNITED STATES PATENT OFFICE.

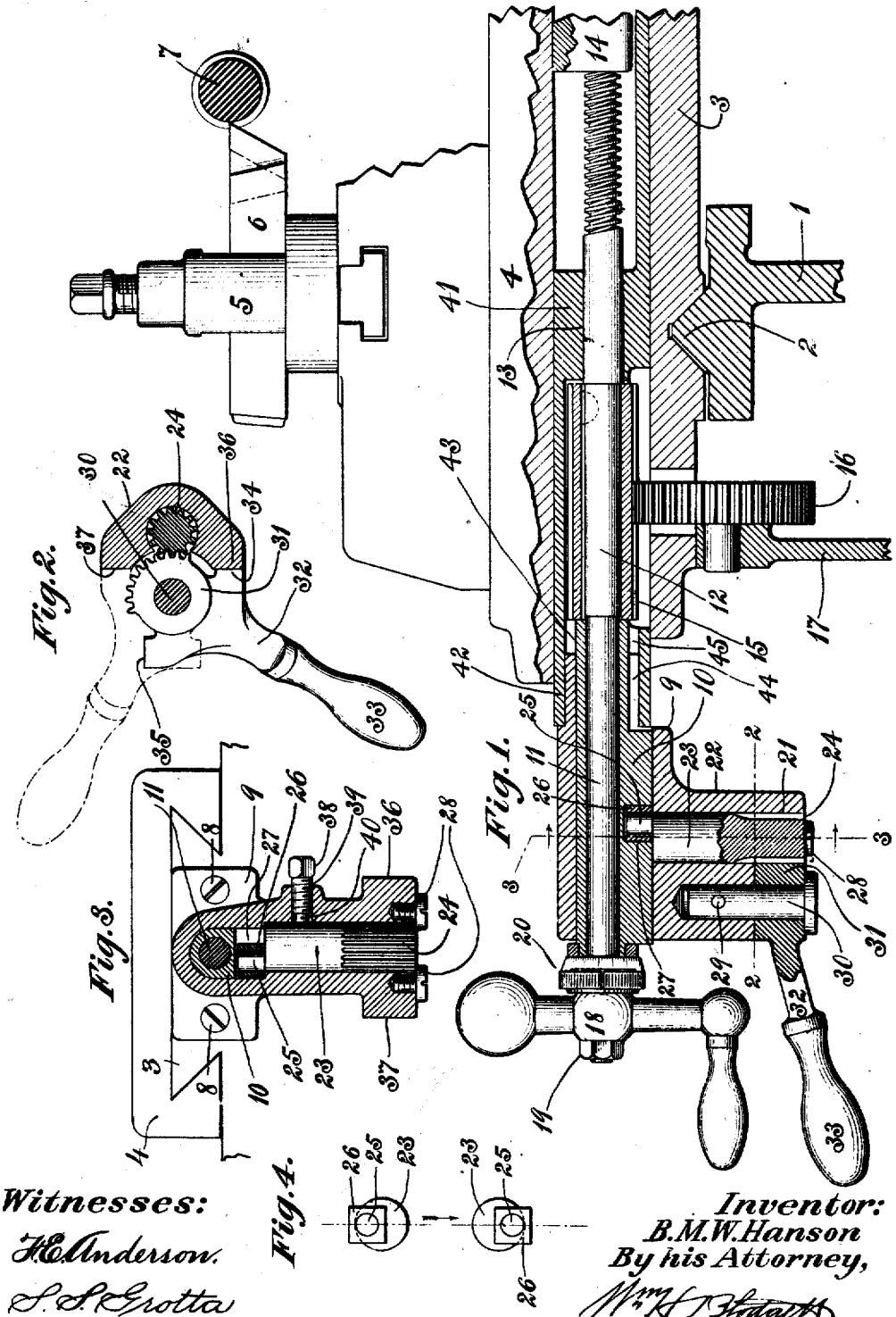
B. M. W. HANSON.
MECHANISM FOR SHIFTING THE CROSS SLIDES OF LATHES.
APPLICATION FILED JULY 11, 1906.
921,985.
Patented May 18, 1909.
Witnesses:
H. E. Anderson.
S. S. Grotta.
Inventor:
B. M. W. Hanson
By his Attorney,

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

MECHANISM FOR SHIFTING THE CROSS-SLIDES OF LATHES.

No. 921,985.     Specification of Letters Patent.     Patented May 18, 1909.

Application filed July 11, 1906. Serial No. 325,606.

*To all whom it may concern:*

Be it known that I, BENGT M. W. HANSON, a citizen of Sweden, having declared my intention of becoming a citizen of the United States of America, residing at Hartford, in the county of Hartford and State of Connecticut, have invented certain new and useful Improvements in Mechanism for Shifting the Cross-Slides of Lathes, of which the following is a specification.

This invention relates to lathes and other machines in which it is frequently desirable to shift the cross-slide without affecting the accurate adjustment thereof with relation to the work, and the main object of the invention is the provision of means for accomplishing this result.

A further object of the invention is the provision of mechanism applied to the cross-slide, and in which rotary motion is converted into variable speed reciprocatory motion.

Other objects of the invention will be hereinafter set forth.

In the accompanying drawings, Figure 1 is a sectional view of the cross-slide and carriage of a lathe, parts being shown in elevation. Fig. 2 is a sectional view on line 2—2 of Fig. 1; Fig. 3 is a sectional view on line 3—3 of Fig. 1, certain parts being shown in an intermediate position; and Fig. 4 is a detail hereinafter described.

Like numerals designate similar parts throughout the several views.

Referring to the drawings, the numeral 1 designates a portion of a lathe-bed, 2 one of the ways thereof, and 3, the usual carriage adapted for longitudinal reciprocation thereon.

Mounted upon the carriage is a cross-slide 4 provided with the usual tool-post 5 carrying a lathe-tool 6, shown in position to engage the work 7. Attached to the front of the carriage 3 by screws 8 is a bracket 9, within which is located a bearing 10, bored to receive the slightly reduced part 11 of a shaft 12, said shaft being provided with an additional bearing in the carriage at 13, beyond which it is threaded to engage a nut 14 rigidly secured to the under side of the cross-slide 4. Keyed to the shaft 12 between bearings 10 and 13 is a barrel pinion 15, in mesh with a gear 16 carried by apron 17, and driven by mechanism (not shown) which constitutes a power cross-feed. To enable the cross-slide to be operated by hand, shaft 12 is equipped with a crank 18 secured by a nut 19. Adjacent the end of bearing 10 is a micrometer gage 20 of which a detailed description is unnecessary, as it has no bearing on the present invention.

Within a bore 21 in the depending body 22 of bracket 9 is a short shaft 23, having a pinion 24 at its lower end, and provided at its upper extremity with an eccentrically-located wrist-pin 25 surrounded by a bushing 26 fitted in a transverse slot 27 in the under side of bearing 10. Headed screws 28 prevent shaft 23 from being displaced from its proper position.

Adjacent to shaft 23 and secured by a pin 29 in a bore of the bracket 9 is a stud-shaft 30 having mounted thereon a toothed segment 31 in mesh with pinion 24 of shaft 23. An extension 32 of the segment 31 terminates in a handle 33 by means of which said segment is operated, the arc of travel thereof being limited to ninety degrees by projecting stops 34 and 35 (see full and dotted lines Fig. 2), which come in contact with extensions 36 and 37, respectively, of the bracket-body 22.

Segment 31 has a ratio to pinion 24 of one to two, and, therefore, a quarter turn of said segment will turn shaft 23 one half of a revolution, and as the wrist-pin 25 of the shaft 23 carries the bushing 26 which is fitted in the transverse slot 27 of bearing 10, it will impart to said bearing a longitudinal travel equal in length to the throw of said wrist-pin 25, and will thereby shift the screw-shaft 12 and all parts connected therewith from the full-line position to the dot-and-dash line position representing the withdrawn point of tool 7, as illustrated in Fig. 1.

A desirable feature of the conversion of the rotary motion of shaft 23 into the reciprocatory motion of bearing 10 exists in the variable speed produced in the latter, the speed thereof gradually increasing from the start and gradually decreasing toward the finish, thereby preventing objectionable shock when either the advance or return movement of the cross-slide ceases.

A set-screw 38 threaded into the bracket-body 4 at 39, and provided with a brass shoe 40, serves to lock shaft 23 against rotation, should it be desirable rigidly to secure the bearing 10 to bracket 9.

Designated by 41 is a frame mounted on the carriage, and having a part thereof formed as a sleeve 42, provided with an opening 43 to receive an extension 44 of bracket 9, the conformation of said extension being similar in cross-section to bearing 10. (See Fig. 3). This sleeve 42 is of sufficient length to afford a space 45 between the pinion 15 and the end of the reduced bracket extension 44 which will permit of the necessary travel of the bearing 10, and connected parts, said bearing being mounted between the end of the pinion 15 and the handle 18, so that as it reciprocates the screw shaft 12 will move with it.

Especial advantage may be derived from the use of this mechanism in cutting either internal or external threads, the operator being enabled in either case instantly to cause the tool 6 to engage or disengage the stock 7 by a slight movement of the handle 33 without in the least affecting the accurate adjustment of said tool necessary in the work being done thereby.

The shaft or plug 23 with its wrist or eccentric stud 25 presents a simple and effective device for reciprocating the bearing 10 and also the feed screw 11 and for locking said two parts in their extreme adjusted positions the locking action being wholly automatic this being quite advantageous when the bearing and shaft are locked in their advanced positions in that they are rigidly and substantially held against rearward thrust by reason of which the tool of whatever character it may be will be unyieldingly maintained in contact with the work.

While the preferred form of construction is disclosed in the accompanying drawings, it is distinctly to be understood that the invention is not limited to the precise elements shown and described, for many changes may be made, and it may be applied to various machines other than that shown, if desired.

Having thus described the invention, what I claim is:-

1. The combination of a tool-slide, a carriage on which said tool-slide travels, a nut connected with said tool-slide, a screw coöperative with the nut, for operating the slide, a bearing in which said screw turns, for reciprocating said screw and thereby said slide, and a turnable shaft supported independently of the slide and having a wrist pin for reciprocating said bearing.

2. The combination, with a tool-slide, and with a carriage upon which the same is mounted, of a nut secured to the tool-slide; a screw working in said nut; a bracket secured to the carriage, and having a bore; a slotted bearing mounted for reciprocatory movement in the bracket and connected to the screw-shaft; and a rotary shaft having a wrist-pin fitted in the slot of the bearing.

3. The combination, with a tool-slide, and with a carriage upon which it is mounted for transverse adjustment, of a nut secured to the carriage; a screw working in the nut; a bracket secured to the carriage, and having a bore; a slotted bearing mounted for reciprocable movement in the bore of the bracket, said bearing being connected to the screw-shaft; an oscillatory shaft having a wrist-pin entering the slot of the bearing; means for oscillating said shaft; and stops for limiting the movement of said shaft in either direction.

4. The combination, with a tool-slide, and with a carriage upon which it is mounted for transverse adjustment, of a nut secured to said tool-slide; a screw working in the nut; a bracket secured to the carriage and having a bore; a slotted bearing mounted in the bore of said bracket, said bearing being connected to the screw-shaft; a shaft having a wrist-pin working in the slot of the bearing; a pinion rigid with said shaft; and a sector for actuating the pinion.

5. The combination of a tool-slide, a carriage on which said tool-slide travels, a nut connected to said tool-slide, a screw coöperative with the nut, for operating said slide, a bearing for reciprocating said screw and thereby said slide, a shaft provided with means for reciprocating said bearing and also with a gear, said shaft being supported independently of said slide, and a manually operated gear in mesh with said first mentioned gear for turning the latter and thereby effecting the reciprocation of said bearing.

In testimony whereof I affix my signature in presence of two witnesses, on the 21st day of June, 1906.

BENGT M. W. HANSON.

Witnesses:
KATHRYN T. M. O'CONNELL,
HENRY L. HUNTINGTON.